(12) United States Patent
Trice

(10) Patent No.: US 6,418,991 B1
(45) Date of Patent: Jul. 16, 2002

(54) PUNCTURE PROOF INNER TUBE

(76) Inventor: Michael L. Trice, 5213 Elmer Ave., Baltimore, MD (US) 21215

( * ) Notice: Subject to any disclaimer, the term of this patent is extended or adjusted under 35 U.S.C. 154(b) by 0 days.

(21) Appl. No.: 09/472,513

(22) Filed: Dec. 27, 1999

(51) Int. Cl.$^7$ ................................................ B60C 5/04
(52) U.S. Cl. ...................................... 152/195; 152/512
(58) Field of Search ................................ 152/510–512, 152/195, 322, 192; 156/118, 121

(56) References Cited

U.S. PATENT DOCUMENTS

| | | | |
|---|---|---|---|
| 598,763 A | * | 2/1898 | Birnbaum .................... 152/511 |
| 639,400 A | * | 12/1899 | Kempshall .................. 152/511 |
| 663,633 A | * | 12/1900 | Mason ......................... 152/512 |
| 974,861 A | * | 11/1910 | Dawson ....................... 152/512 |
| 1,156,155 A | * | 10/1915 | Landis ......................... 152/512 |
| 1,162,745 A | * | 12/1915 | Blodgett ...................... 152/512 |
| 1,279,228 A | * | 9/1918 | Berryman .................... 152/512 |
| 1,516,030 A | * | 11/1924 | Thurlow ...................... 156/118 |
| 3,831,653 A | | 8/1974 | Moore |
| 4,263,074 A | | 4/1981 | Price |
| 4,324,279 A | * | 4/1982 | McFarlane .................. 152/322 |
| 4,347,884 A | | 9/1982 | Price |
| 4,945,965 A | | 8/1990 | Kim |
| 5,679,184 A | | 10/1997 | Hosking |
| 5,685,925 A | | 11/1997 | Riquier et al. |
| 5,785,779 A | | 7/1998 | McGee et al. |
| 5,795,414 A | | 8/1998 | Chih |

FOREIGN PATENT DOCUMENTS

| | | | | |
|---|---|---|---|---|
| GB | | 342675 | 10/1929 | |
| GB | | 439322 | 9/1934 | |
| GB | | 458167 | 3/1935 | |
| GB | | 2049573 A | * 12/1980 | .................. 152/204 |

* cited by examiner

Primary Examiner—Geoffrey L. Knable
(74) Attorney, Agent, or Firm—Richard C. Litman

(57) ABSTRACT

An improved pneumatic tube formed from a semi-rigid, air-tight rubber core encased by a plurality of thin, armoring Kevlar layers bonded to the exterior wall of the core. The composition can be used as inner tubing for cars, bikes, motorcycles, planes, and any kind of vehicle having a pneumatic inner tube. It can also be formed into a puncture proof rubber raft.

1 Claim, 3 Drawing Sheets

PUNCTURE PROOF INNER TUBE

BACKGROUND OF THE INVENTION

1. Field of the Invention

The present invention relates to an armored rubber composition for use as an inner tube for a cycle or a raft.

2. Description of the Related Art

The bicycle commuter and/or bike enthusiast frequently encounters flat tires due to blunt forces, thorns, glass, wood chips, metal objects and other debris. A flat tire can be a significant hassle. In order to anticipate and respond to flat bicycle tires, the biker must carry a number of items, including patches, glue, tools, and a pump. However, patching a tire can be cumbersome and very greasy for the hands. Even after the cyclist fixes the flat, he or she will often discover that the next day, the tire is flat again due to stresses placed upon, and pinching of, the inner tube during the process of fixing the flat.

Some cyclists will use a gooey, fibrous, liquid sealant, sometimes called "slime." Liquid sealants clog the punctures temporarily, and there are a number of draw backs to using them. In general, liquid sealants are affected by gravity, and they settle to the bottom of the tire. They also can fail outside of the optimum suggested temperature. Certain, if not all liquid sealants, for example, disrupt the balance of the tire, cause noise and eventually damage the rim. Occasionally, the liquid sealant will leak out of the tube and valve.

One product, known as a "toughy," comprising a plastic strip, is placed between the tube and the tire to aid the tire in resisting punctures. Toughies do not always work because they do not protect the entire tube, only the top surface, and they do not prevent "snake bites"—that is, when the tube is pinched between the rim and tire, or between the rim and a tire tool used to remove the tire. Moreover, toughies have been known to abrade the outside surface of the tube, and actually create conditions leading to tube failure. A number of patents have attempted to address the issue of puncture prevention and/or mitigation, most of them with limited success:

U.S. Pat. No. 5,785,779 issued July, 1998 to McGee et al. describes a Kevlar® tire liner, similar to a toughie. The McGee device is not an inner tube, nor is the insert inflatable, it is a strip of material that rests between the inner tube and the tire. Thus, McGee et al. do not teach the present invention as claimed.

U.S. Pat. No. 4,945,965 issued on August, 1990 to Kim, describes a tire having deflatable safety balloons between the tread and the main compressible area of the tire (the inner tube). The safety balloons, when punctured, deflate to allow contiguous balloons to occupy the vacuum resulting from the deflated balloon. Kim does not teach the present invention as claimed.

U.S. Pat. No. 3,831,653 issued on August, 1974 to Moore, describes a vehicle tire casing in combination with a flexible lead tube. However, lead and the other specified metals add excessive weight to the inner tube, they tend to conduct heat, fracture, and are subject to oxidization. Moore does not teach the present invention as claimed.

U.S. Pat. No. 4,263,074 issued on April, 1981 to Price, describes a trough-shaped tire liner. U.S. Pat. No. 4,347,884 issued on September, 1982 to Price, D. R. describes another tire liner. Neither '074 nor '884 patent teaches the present invention as claimed.

U.S. Pat. No. 5,679,184 issued on October, 1997 to Hosking, describes a resiliently deformable polyurethane ring between the rim and the inner tube, designed for preventing "pinch punctures," also known as "snake bites." Hosking does not teach the present invention as claimed.

U.S. Pat. No. 5,685,925 issued on November, 1997 to Riquier et al. describes a tire device, principally for military use, comprising a toroidal cushion in which airtight channels extend circumferentially through the cushion. Riquier does not teach the present invention as claimed.

U.S. Pat. No. 5,795,414 issued on August, 1998 to Chih, describes a puncture resistant tire assembly marked by an inner tube segment having finger-like deflector structures cooperating with a tire liner having ridge-like separator structures. Chih does not teach the present invention as claimed.

British Patent No. 439,322 having an application date of September, 1934 describes an impermeable coating, such as tanned gelatin, for rubber inner tubes. British Pat. No. 439,322 does not teach the present invention as claimed.

British Patent No. 458,167 having an application date of March, 1935 describes an inner tube having thickened portions that provide the inner tube with better self-sealing properties. British Pat. No. 458,167 does not teach the present invention as claimed.

British Patent No. 342,675 having an application date of October, 1929 describes a durable and efficient "built-up" inner tube. The rubber inner tube maintains layers of carbon black sheet rubber, and tough tread rubber, disposed on the surface that faces the tire. British Pat. No. 342,675 does not teach the present invention as claimed.

None of the above inventions and patents, taken either singularly or in combination, is seen to describe the instant invention as claimed. Thus a puncture proof inner tube solving the aforementioned problems is desired.

SUMMARY OF THE INVENTION

The present invention is an improved pneumatic chamber formed from a semi-rigid rubber layer, encased by a puncture proof plurality of layers. The composition can be used as inner tubing for cars, bikes, motorcycles, planes, and any kind of vehicle having pneumatic inner tubes. It can also be formed into a puncture proof rubber raft. The preferred device is constructed from a toroid-shaped, thick-walled, semi-rigid, air-tight core chamber. A plurality of toroid-shaped layers of armored material, such as that under the trade name Kevlar®, Spectraflex®, or similar flexible puncture-proof webbing, is bonded to the exterior wall of the core chamber.

Since the inner tube of the present invention is semi-rigid and has a 100% armored exterior surface, flats that would otherwise be caused by pinching of the tube are avoided; the tube is resistant to flats caused by blunt forces, e.g. a curb; and it is generally puncture proof. It is great for off-road riding on any kind of terrain. Once the inner tube is in place, it is good for years of uninterrupted use and, at the very least, for the life of the tire. The composition can also be used to make puncture proof rubber rafts.

Accordingly, it is a principal object of the invention to provide an armored inner tube that can prevent punctures from occurring at any location on the tube.

It is another object of the invention to provide a thick, semi-rigid inner tube that is resistant to pinch-type or "snake bite" punctures, and will not blister, i.e., will remain intact even if the tire itself splits open.

It is a further object of the invention to provide an armored rubber composition that when used as a water craft, or as an inner tube, enables uninterrupted use throughout the life of the craft or tire.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 2:
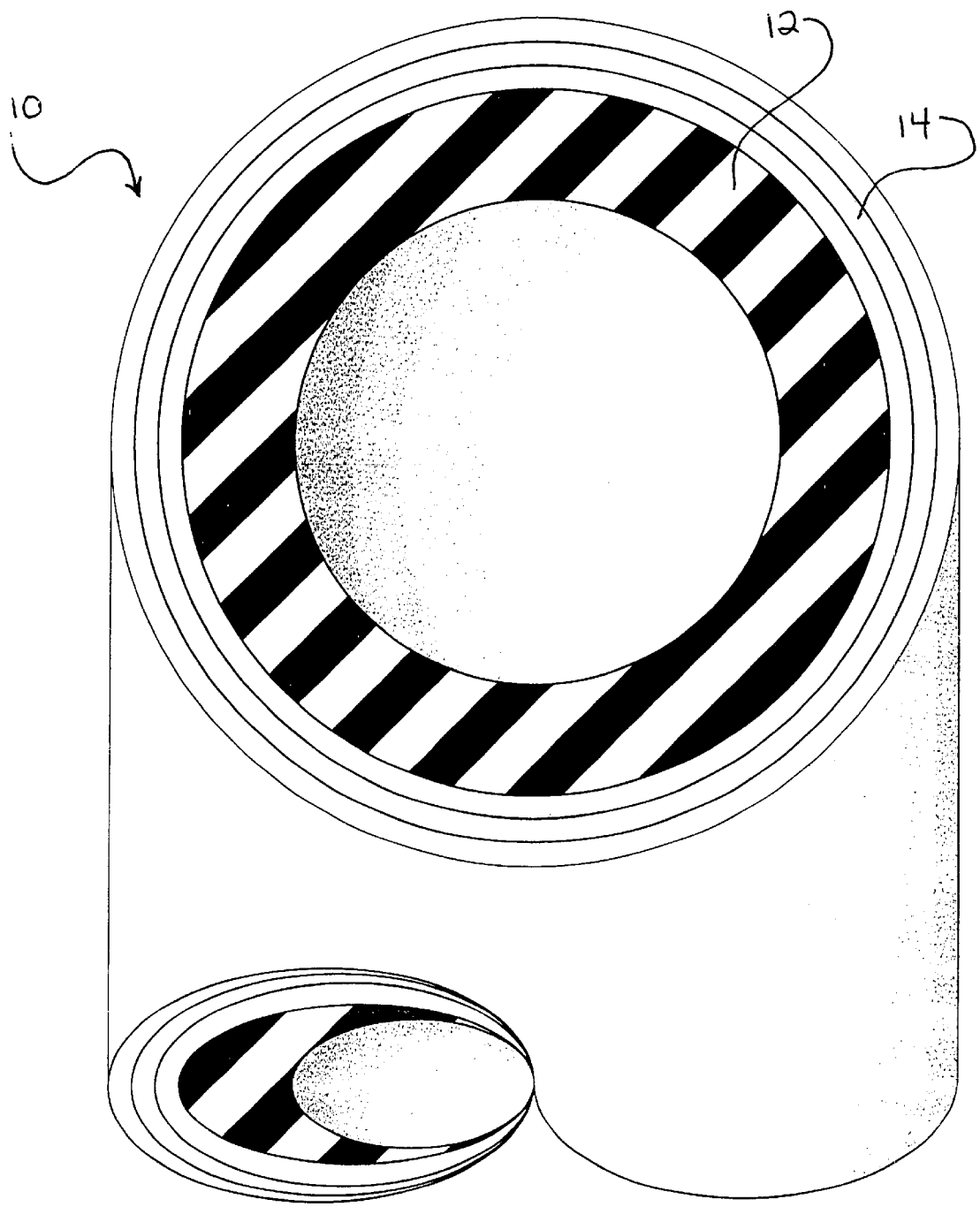
FIG. 2 is a cross section of a segment of the inner tube device prior to inflation with a shape suggesting its semi-rigidity.

As best shown in FIG. 2, the present invention is an inner tube 10 for a raft or a vehicle tire, comprising a flexible, puncture-proof outer wall 14, or skin, bonded to a thick, semi-rigid pneumatic rubber inner wall 12, or core. Tube 10, comprised of inner wall 12 and outer wall 14, is toroid-shaped. Outer wall 14 is bonded to, and concentric with, inner wall 12. Any suitable bonding technique may be used to bond wall 12 to wall 14, including heat welding or the use of durable adhesives.

In the present invention, the adjective "thick," when used to describe inner wall 12, means three to ten times thicker than the wall thickness of a standard bicycle inner tube. "Semi-rigid" shall mean that, in the absence of external forces, wall 12 retains its toroidal shape even when deflated. This thickness helps it to maintain its shape at all times, and prevents it from being subject to "snake bites" or other pinch-type failures.

Puncture proof outer wall 14 is comprised of a plurality of similar layers numbering between one and four. According to the preferred embodiment, outer wall 14 contains three thin layers of a puncture proof, armoring material such as is used for the making of bullet-proof vests, and as manufactured under the trade names Kevlar®, Spectraflex® or Twaron®, or other suitable puncture-proof material. Kevlar is made by I. E. Dupont and is an aramid or synthetic, polymeric fiber with a polyamide construction. Kevlar 29 is used for ballistic protection. Kevlar 49 is used in v-belts, hoses, and composite armor. Spectraflex is made by AlliedSignal, Inc. of Morristown, New Jersey. Twaron is made by Enka, B. V. of Arnheim. Regarding outer wall 14 of the present invention, "puncture proof" shall mean that the tube is not subject to puncture failure commonly associated with bicycle tires. A bike having the present inner tube can run over curbs, glass, and even nails without scratching the rubber inner wall 12 portion of inner tube 10. Virtually any sharp object encountered on a road or pathway is deflected before any damage can occur to the core tube. Because outer wall 14 is toroid-shaped, it provides protection from all angles, not just from the tread surface.

Figure 1:
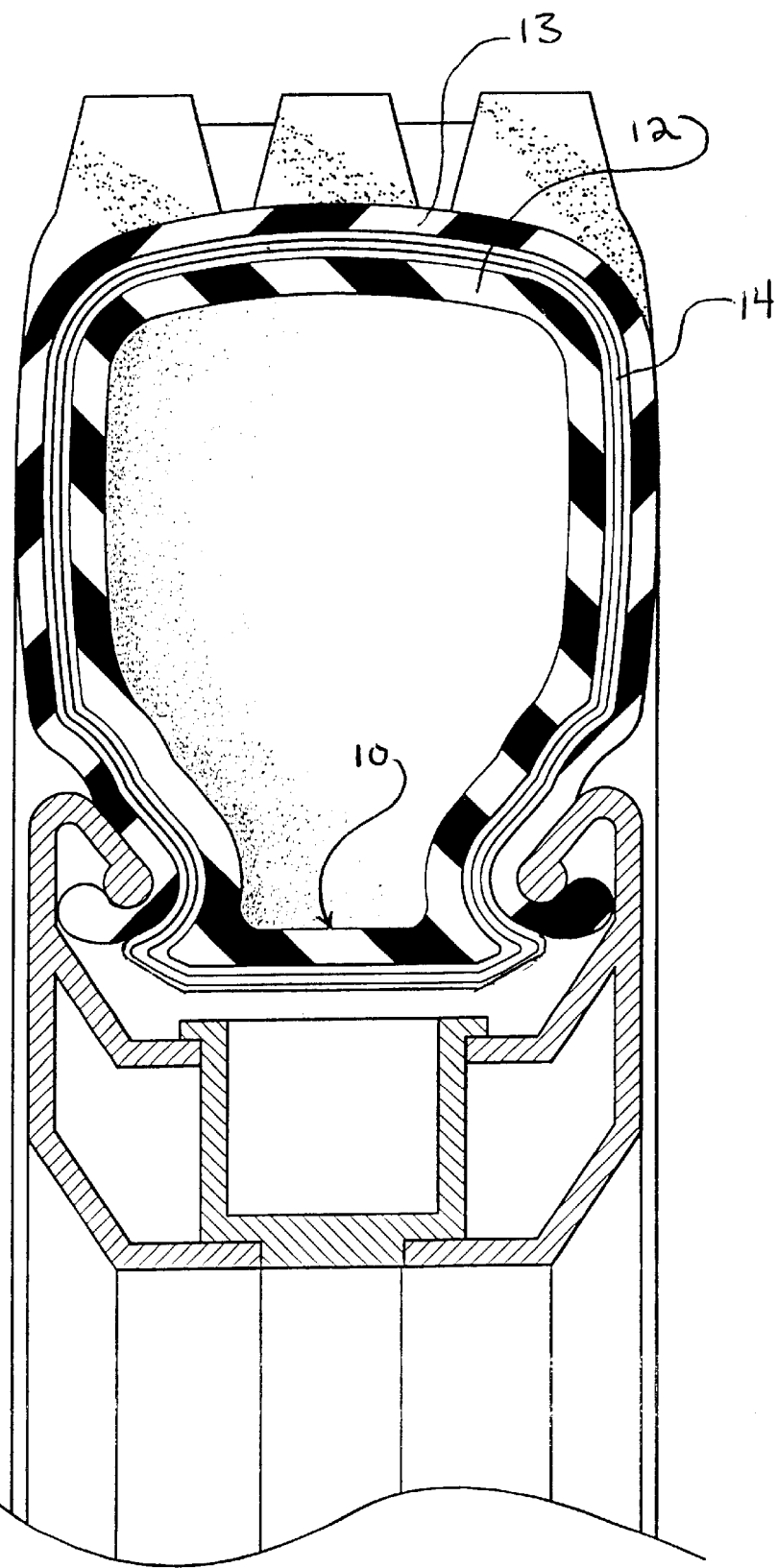
FIG. 1 is an environmental, section view of the present composition in its operating environment as the tube in an inflated mountain bike tire.

Tube 10 is preferably used as an inner tube for a vehicle, such as a mountain bike. As shown in FIG. 1, when sized for a bicycle tire, tube 10 is made to fit snugly within tire 13 in its deflated condition, filling up at least ninety (90) percent, but preferably one hundred (100) percent of the void inside tire 13. Tube 10 essentially maintains its volume as it is pumped full of air, i.e., there is very little expansion of the tube. Rather, the tube primarily gets harder as it is filled up with air. Tube 10 will not blister like standard bicycle tire inner tubes, and will stay intact even if the tire is torn open. Thus, the purchaser of this product will require no more tube repair kits, no more pumps or patches, and no more grease on his or her hands because there are no flats when using this inner tube.

Figure 3:
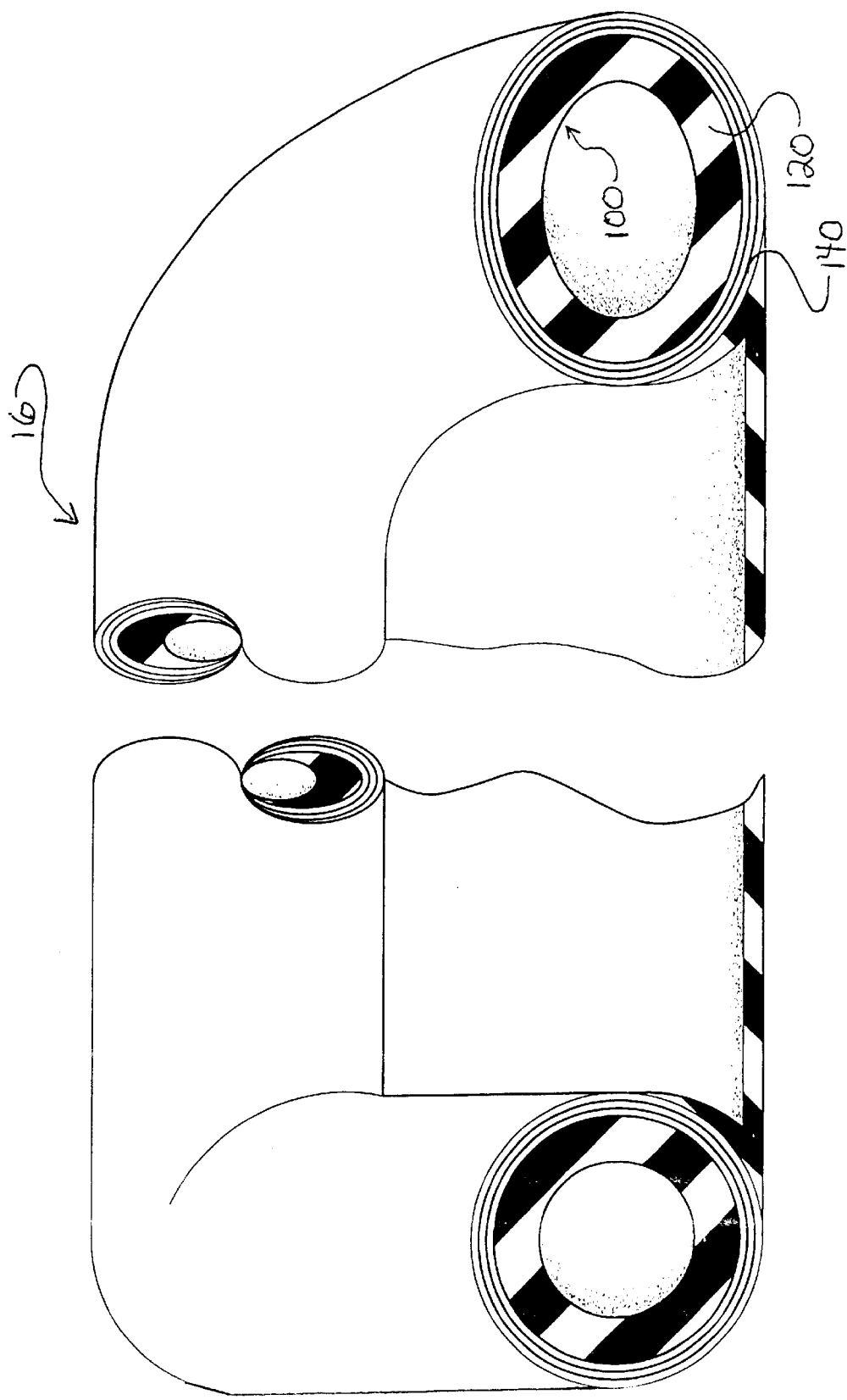
FIG. 3 is a fragmented sectional view of the composition formed into a hollow-tubed rubber raft, with partial cut away of the Kevlar skin.

As shown in FIG. 3, tube 10 may alternatively be used as a raft or other rugged inflatable water craft 16. When used for this alternative purpose, it would resist punctures that would destroy other multi-bladder crafts. Also, because the inner wall 120 is semi-rigid, pressurizing tube 100 will adjust the buoyancy, slightly, without changing the size of the craft. The puncture proof armor 140 can deflect pistol bullets and shrapnel, and is thus excellent for military and law enforcement uses, and superior in rescue-related work.

It is to be understood that the present invention is not limited to the embodiments described above, but encompasses any and all embodiments within the scope of the following claims.

I claim:

1. A pneumatic tube for use in vehicle tires and rafts, consisting of:

an inner wall defining an air chamber, the inner wall consisting of rubber and having the shape of a hollow toroid, and further being sufficiently thick and rigid so that the inner wall retains the toroid shape when deflated; and an outer wall bonded to, and concentric with, said inner wall, the outer wall having the shape of a hollow toroid and encasing said inner wall, the outer wall consisting of a synthetic, polymeric armoring material.

* * * * *